Dec. 26, 1944.   A. KELLER   2,365,765
VEHICLE TOP
Original Filed May 19, 1938   2 Sheets-Sheet 2

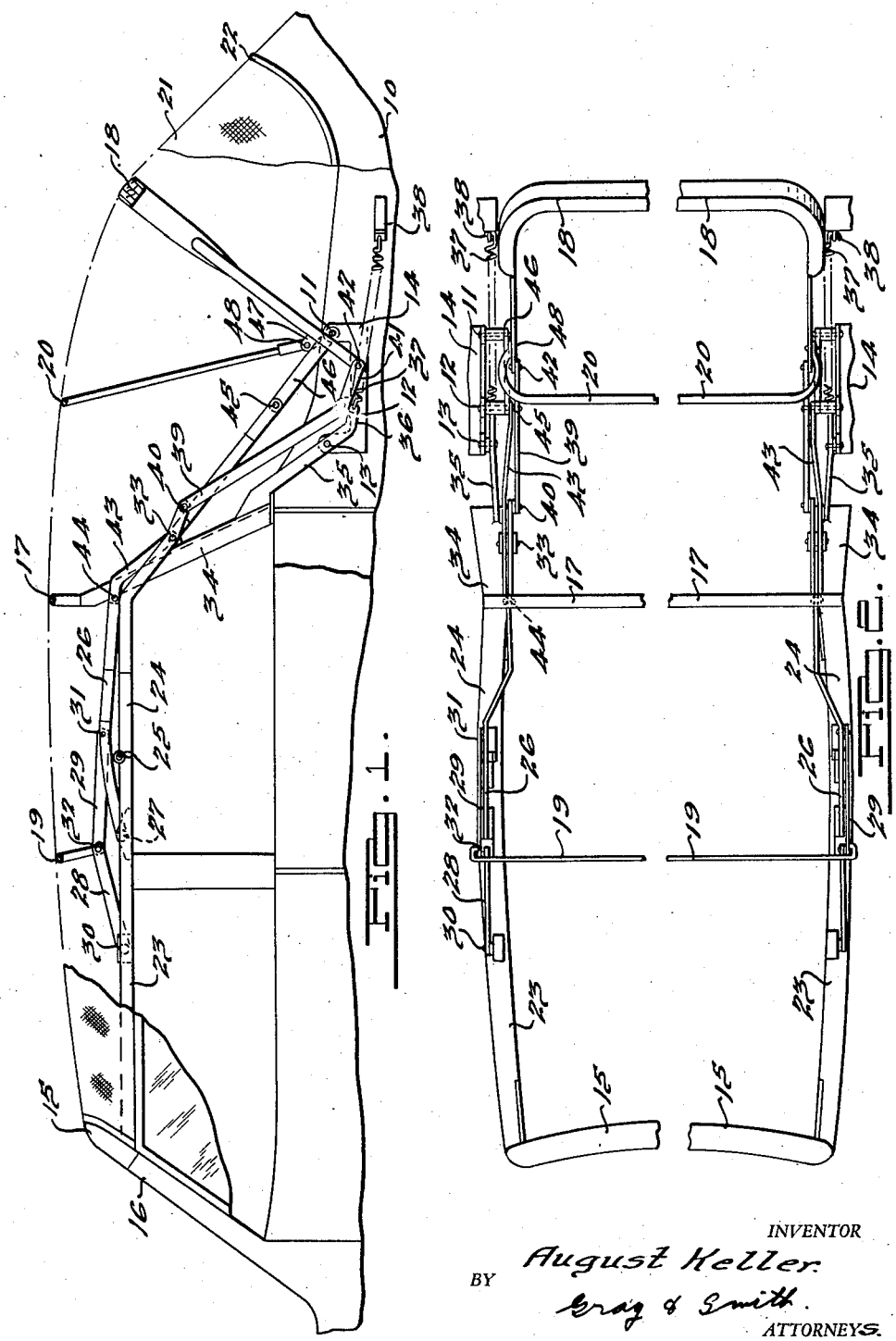

INVENTOR
August Keller.
BY Gray & Smith.
ATTORNEYS.

Patented Dec. 26, 1944

2,365,765

UNITED STATES PATENT OFFICE 2,365,765

VEHICLE TOP

August Keller, Dearborn, Mich., assignor to Motor State Products Company, Ypsilanti, Mich., a corporation of Michigan Original application May 19, 1938, Serial No. 208,876. Divided and this application July 12, 1941, Serial No. 402,208

1 Claim. (Cl. 296—116)

The present invention relates to a vehicle top of the collapsible or folding type.

It is a principal object of the present invention to provide a vehicle top of the collapsible or folding type which may be raised or lowered by a continuous motion initiated by movement of the header bar and in which a balanced condition of the parts is maintained during the various stages of raising and lowering the top.

A further object of the present invention is to provide a vehicle top of the collapsible or folding type in which the folds in the top covering material occur in substantially the same places during successive foldings of the top and in which the top material is uniformly shaped to a desired configuration when the top structure is in the raised or extended position.

Another object of the present invention is to provide a vehicle top of the collapsible or folding type in which jointed prop members are utilized to secure adequate support for the rear pillars when the top is in the raised position and in which provision is made for automatically moving said props into or out of supporting position relative to the pillars by movement initiated by movement of the header bar and transferred to said prop members through a train of pivotally connected links and levers.

Another object of the present invention is to provide a vehicle top of the collapsible or folding type which is of simple and positive operation and which is easily moved from raised to folded position and vice versa. The top construction is such as to be readily manufactured and assembled and is adapted to be folded compactly into a relatively small space provided in the vehicle body.

A further object of the present invention is to provide a vehicle top of the folding or collapsible type in which provision is made for locking the rear pillar in a predetermined upright position against forces tending to change its position, thereby providing a construction in which the upper part of the body door opening is maintained uniformly in a predetermined position, thus insuring positive and easy raising and lowering of the door windows.

A still further object of the present invention is to provide a vehicle top of the collapsible or folding type in which provision is made particularly to automatically brace the top in its raised position against the rearward pull exerted thereon by the top covering material.

Other objects of this invention will appear in the following description and appended claims, reference being had to the accompanying drawings forming a part of this specification wherein like reference characters designate corresponding parts in the several views.

Fig. 1 is a fragmentary elevation partially in section showing the top construction of the present invention applied to a motor vehicle body of the conventional convertible sedan type, the parts of the top being shown in the position which they occupy when the top is in the raised position.

Fig. 2 is a fragmentary plan view with parts broken away showing the parts corresponding to the positions occupied in Fig. 1.

Figure 3:
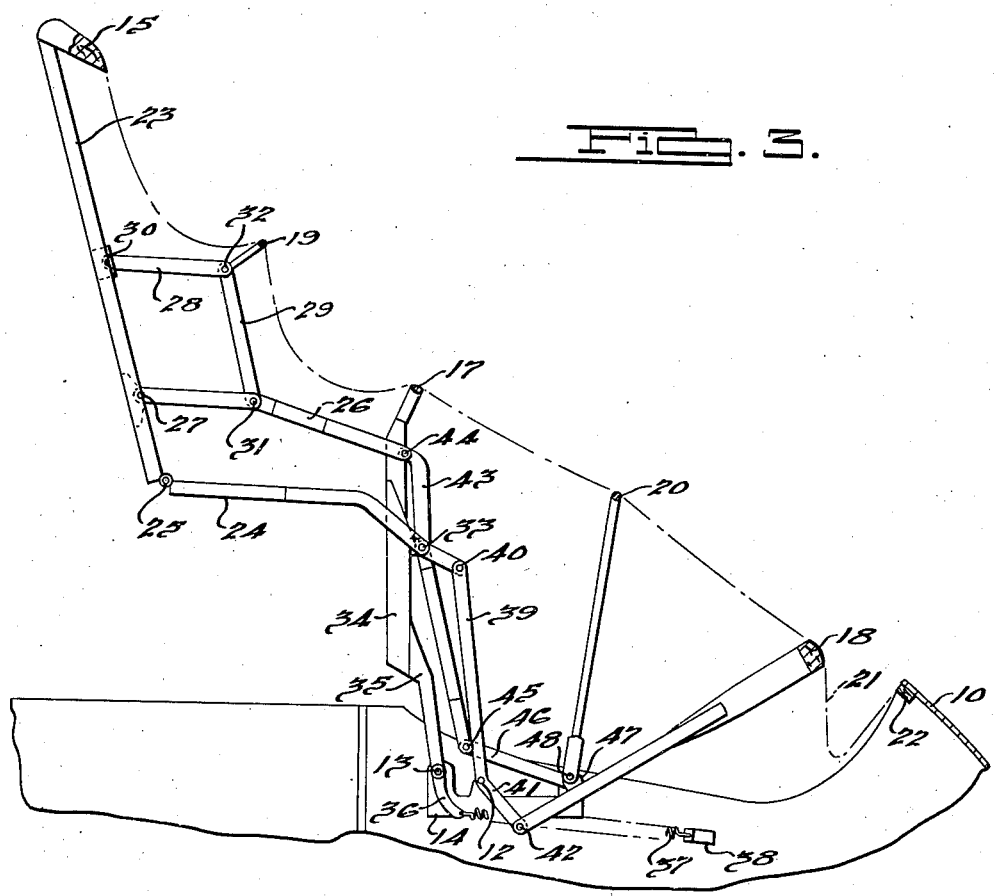
Figs. 3 and 4 are fragmentary elevations partially in section of the top shown in Fig. 1 showing the top respectively in a partially and in a completely folded position.
Figure 4:
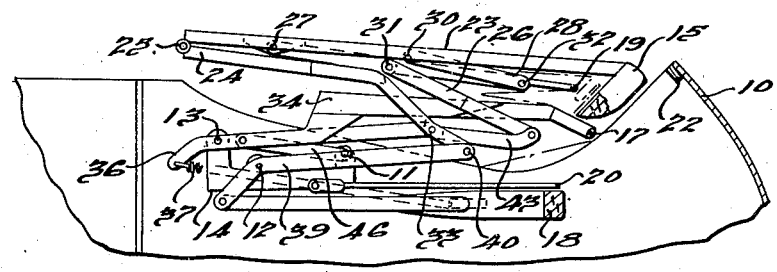

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

Referring to Figs. 1 to 4, inclusive, a motor vehicle top embodying the present invention comprises a framework which is attached to a motor vehicle body 10 by spaced pivotal connections 11, 12 and 13, which are provided on a bracket 14 which is secured to a structural part of the vehicle body. It is to be understood that if desired, the bracket 14 may be replaced by several separate brackets to provide the desired pivot points. The front part of the top is provided with a header bar 15 which is detachably connected with the windshield pillar 16 when the top is in the raised position shown in Fig. 1.

The framework of the top consists of a main bow 17 and a rear bow 18 and a top supporting cross member 19, hereinafter referred to as an "auxiliary bow," disposed between the header 15 and the main bow 17, and a top supporting cross member 20, also hereinafter referred to as an "auxiliary bow," disposed between the main bow 17 and the rear bow 18. The header bar 15, bows 17 and 18 and auxiliary bows 19 and 20 extend horizontally of the vehicle body and provide the framework which, in the raised position shown in Fig. 1, supports and gives shape to the top covering 21.

The rear edge of the top covering 21 is secured to the vehicle body as at 22 and the forward edge of the top covering 21 is secured to the header bar 15. A non-resilient webbing or top pad (not shown) extends from the header bar 15 to the rear bow 18 and is secured thereto. The auxiliary bows 19 and 20 and the main bow 17 are connected with said webbing and are moved thereby in a predetermined manner each time the top is folded. Thus the top material 21 is caused to be folded in predetermined places each time that the top is lowered. When the top is in the raised position as shown in Fig. 1, the bows 17 and 18 and the auxiliary bows 19 and 20 stretch the top covering 21 in such a manner as to provide a neat and unwrinkled covering as shown in Fig. 1, this covering being free from positive attachment to the top frame members except at the header bar at the front and on the body at the rear.

The header 15, bows 17 and 18 and auxiliary bows 19 and 20 are connected by a series of transverse link and lever members hereinafter described in detail with reference to but one side of the vehicle top, it being understood that an identical series of link and lever members is provided on the opposite side of the vehicle top as shown in Fig. 2.

The series of link and lever members above referred to comprises a bow connection 23 which is rigidly secured to the header bar 15 and is pivotally connected with an outrigger lever 24 by means of the pivotal break joint 25. A connecting lever 26 is pivotally connected with the bow connection 23 by the pivotal connection 27. Toggle links 28 and 29 are pivotally connected as at 30 and 31 to the bow connection 23 and the connecting lever 26, respectively. The toggle links 28 and 29 are pivotally connected as at 32 with each other and with an arm secured to the auxiliary bow 19.

The outrigger lever 24 is pivotally connected at 33 with a member carried by the rear pillar 34. The rear pillar 34 is rigidly connected with and supports the main bow 17. The pillar 34 is secured to an arm or bracket 35 which pivotally connects as at 13 with the bracket 14 which is secured to a structural part of the vehicle body. The arm 35 is provided with a curved extending portion 36 which in the embodiment shown in the drawings is preferably connected with a coil spring 37 having its opposite end secured to a bracket 38 which is secured to the vehicle body. The action of the spring 37 is such that when the top is folded in the position shown in Fig. 4, the spring is extended, and when the top is in the raised position illustrated in Fig. 1, the spring is contracted. This action of the spring thus assists in facilitating the raising of the top, the weight of the top when moving to the folded position being such as to extend the spring and build up the spring pressure therein which is delivered back to the link system upon raising of the top.

A balancing lever 39 is pivotally connected as at 40 with an end of the outrigger lever 24 and is pivotally connected as at 12 with the bracket 14. The balancing lever 39 is provided with an end portion 41 which is pivotally connected as at 42 with the end of the leg of the rear bow 18.

A prop joint lever 43 is pivotally connected as at 44 with the end of the connecting lever 26 and is pivotally connected at the point 33 with the rear pillar 34. The prop joint lever 43 has a pivotal connection 45 with a link 46 which in turn is pivotally connected at the point 11 with the bracket 14 secured to a structural part of the vehicle body.

A bracket 47 is secured to the leg of the rear bow 18 and an extending leg connected with the cross member 20 is pivotally connected as at 48 to the bracket 47.

The operation of a collapsible top embodying the present invention is substantially as follows:

When the top is in the raised position as shown in Fig. 1, it is detachably connected by the header bar 15 with the windshield pillar 16. The train of links and levers is pivotally connected with the cross members to form with the cross members the framework of the top. The construction is such that the train of links and levers is prevented from moving to permit pivoting of the cross members relative to the body structure except when the header bar 15 is moved upwardly and rearwardly from the top of the windshield pillar 16.

In the top here shown by way of example, the upward and rearward movement of the header bar causes the bow connections 23 to be moved in an upward direction and through the connected links and lever to impart a rearward thrust to the prop levers 43. This causes a pivotal movement of the joints 45 and breaks the prop levers at said joints so as to permit the rear pillar to pivot relative to the body structure. The breaking of the prop levers at the joints 45 permits the distance between the body pivot 11 and the pivot point 33 on the pillar 34 (Fig. 1) to be shortened.

The shortening of the distance between these pivot points is accommodated by a rearward pivoting of the pillar 34 (Fig. 1). The position of the respective parts upon the rearward pivoting of the pillars is shown in Fig. 3. It is to be noted that in the construction shown, the points of pivotal connection between the top construction and the vehicle body are spaced from each other as distinguished from prior known constructions.

Frequently the body pivot points of the respective parts of the top construction are closely adjacent each other. This spacing of the body pivot points is an important feature of the present invention and contributes to the ease of operation of the top embodying the present invention and in a smoothness of operation during the folding and unfolding cycles of operation.

Also it is to be noted that the prop lever 43 shown in Fig. 1 is so arranged that the body pivot point, the intermediate pivot point, and the pivotal connection with the rear pillar lie in a substantially straight line when the top is in the raised position. This member provides a longitudinal support for the rear pillar and holds the rear pillar in the upright position when the top is in its raised position. This is particularly desirable in tops of the so-called "tumble in" design in which the rear section is inclined downwardly at an angle to the rear bow so that the tension of the top material exerts a force on the top structure tending to move the parts to the folded or collapsed position.

The rear pillar is maintained in the upright position during the initial step of the folding operation which consists in the first movement of the header bar upwardly and rearwardly from the point of connection with the windshield pillar. As the header bar is moved, the prop levers are then broken and moved from their supporting positions. As soon as the prop levers are moved from their supporting positions, the rear pillars are permitted to pivot relative to the body. This breaking of the prop levers prior to the pivotal movement of the rear pillars results from the location of the pivots 44 (Fig. 1) at points forward of the face of the rear pillars 34. Thus the movement of the header bar is transmitted to the prop levers and a force is exerted thereon which causes the levers to collapse when the pivot points are thrown out of alignment. The movement of the header bar in the opposite direction brings the pivot points of the prop levers into alignment automatically and thus supports the rear pillars in predetermined location in the raised position.

The provision of a prop lever automatically moved to supporting and non-supporting positions relative to the rear pillars is a desirable feature which imparts rigidity to the rear portion of the top structure when in the raised position and assists in securing a positive alignment of all parts of the top when moved to the raised position from the folded position.

The spring 37 (Fig. 1) is a desirable arrangement in certain types of top constructions, particularly where the top construction is relatively heavy. The spring 37 readily ansists in the initial movement of the top from its folded position towards its open position. Its function is chiefly that of a counterbalancing member while the top is being moved from its raised to its folded position.

The covering material for the framework of the top of the present invention may be any suitable flexible covering material, such for example as cloth, leather, imitation leather, rubber, and like or similar materials.

It will be readily observed from the foregoing that the top construction of the present invention provides a vehicle top of the collapsible type which is readily moved from closed to open position or vice versa and in which the movement in either direction is initiated by movement of the header bar. This construction, while providing a top which folds compactly and occupies but a limited space when folded, produces a top construction which is of unusual stability and rigidity when in the raised position.

While the top construction herein shown by way of example is intended to be manually moved from the raised to the folded position and from the folded to the raised position, it is within the scope of the present invention to provide a power-actuated device for raising and lowering the top, as for example suction or hydraulically operated cylinders, electrically driven motors, and the like. In such event the power-actuated device could be substituted for the spring 37 in the top construction shown in the drawings, and while the application of power would be at a different position relative to the header bar, the linkages herein described in the operation of the top would be substantially the same. It is apparent that the cycles of operation during the opening and folding of the top by such power-actuated members will be substantially the same as that herein described.

The present application is a division of my co-pending application Serial No. 208,876, filed May 19, 1938, now Patent No. 2,255,289, dated Sept. 9, 1941.

I claim:

A collapsible top having long unobstructed side spans intended primarily for a vehicle of the sedan type having a rear compartment to receive the top when in folded position, said top having a plurality of longitudinally spaced supporting means comprising a header bar, a pillar including a main bow and an arm pivotally mounted on one of said supporting means intermediate its length, a balancing spring interposed between the free end of said arm and a spaced point on said vehicle, an outrigger lever pivotally mounted intermediate its length on the pillar, a balancing bell-crank lever, one arm of which is pivotally connected to the rear end of the outrigger lever and pivotally mounted at its fulcrum to a bracket secured to the vehicle body, a rear bow pivotally mounted on the free end of the other arm of said bell-crank balancing lever, whereby the rear bow is first moved forwardly of the vehicle and then downwardly during folding of the top to nest in said rear compartment and is first moved upwardly and then rearwardly of the vehicle during the raising of the top, a prop lever pivotally mounted intermediate its length on the pillar, a supporting link pivotally mounted at one end to the rear end of the prop lever and pivotally mounted at its other end to one of said spaced supporting means, bow connecting means between the forward end of the outrigger lever and the header bar, and link connecting means between the forward end of the prop lever and said bow connecting means.

AUGUST KELLER.